United States Patent [19]
Granqvist

[11] 3,888,588
[45] June 10, 1975

[54] INSTRUMENT FOR MEASURING DISTANCE

[76] Inventor: Carl-Erik Granqvist, Tulevagen 18, Lidingo, Sweden

[22] Filed: Jan. 30, 1973

[21] Appl. No.: 328,086

[30] Foreign Application Priority Data
Feb. 3, 1972 Sweden.......................... 001220/72

[52] U.S. Cl................................. 356/5; 343/12 R
[51] Int. Cl........................... G01c 3/08; G01s 9/04
[58] Field of Search....................... 356/5; 343/12 R

[56] References Cited
UNITED STATES PATENTS

| | | | |
|---|---|---|---|
| 3,019,690 | 2/1962 | Hildebrand et al..................... | 356/5 |
| 3,446,971 | 5/1969 | Ruddock................................ | 356/5 |
| 3,508,828 | 4/1970 | Froome et al. ......................... | 356/5 |
| 3,619,058 | 11/1971 | Hewlett et al. ......................... | 356/5 |

FOREIGN PATENTS OR APPLICATIONS 337,704  8/1971  Sweden

OTHER PUBLICATIONS
Nakazawa, Japan Electronic Eng, 7-1971, pp. 30–36.

Primary Examiner—Maynard R. Wilbur
Assistant Examiner—S. C. Buczinski
Attorney, Agent, or Firm—Burns, Doane, Swecker & Mathis

[57] ABSTRACT

Instrument and method for distance measurement with a transmitter and a receiver for modulated light, where the delay of the light is compared with a delayed signal within the instrument. This internally delayed signal is created by a variable delay, for instance a radio goniometer, ahead of an electronic frequency divider so that the output of the frequency divider has a phase accuracy which is a multiple of that of the variable delay. The measuring frequencies to be compared are equal to the down-divided frequency so that the main amplification in the receiver is on this lower frequency. A switch is provided so that the modulation frequency of the transmitted light may be at either of two frequencies to provide both a coarse and a fine reading.

11 Claims, 9 Drawing Figures

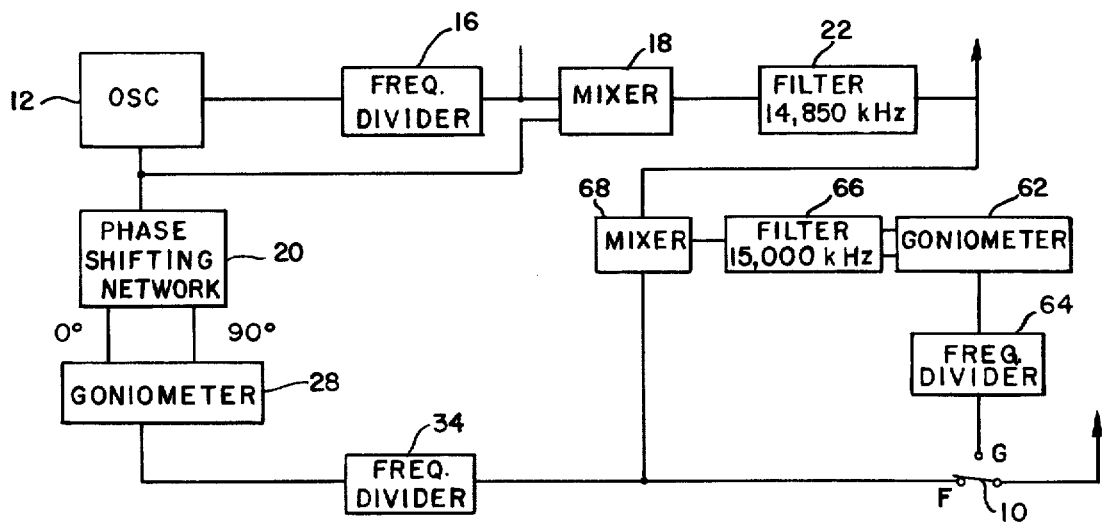
Fig. 3
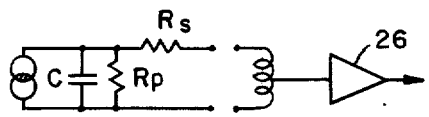
Fig. 4
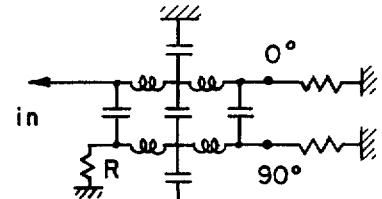
Fig. 5
Fig. 6A  Fig. 6B
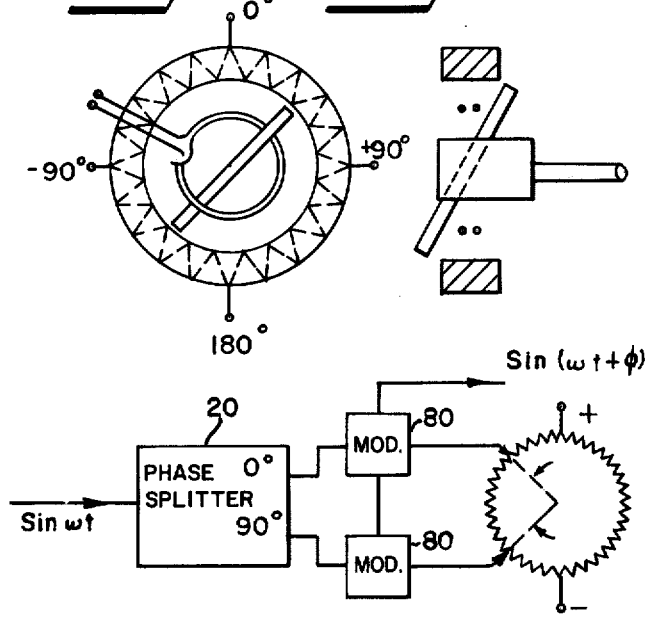
Fig. 8
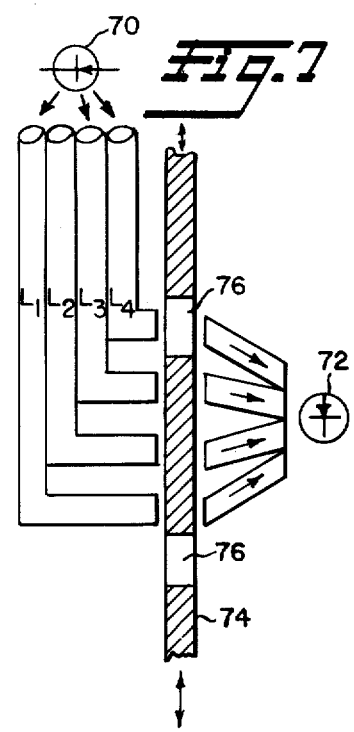
Fig. 7

INSTRUMENT FOR MEASURING DISTANCE

This invention relates to a distance measuring instrument and method in which a radiant energy signal is transmitted over the distance to be measured and received after a reflection and the delay of the signal is measured.

For distance measurements made in the field, an accurate and small instrument is required. The instrument should have low weight and low energy consumption. Such instruments have hitherto been heavy due to complicated electronics which also consume much electric power.

It is an object of the present invention to provide a novel instrument which is small and compact, and which has low power requirements and can provide accurate measurements of distance between the instrument and a distant object.

Another object is to provide a novel instrument and method wherein the high accuracy measurement is obtained by making the measurement at two or more frequencies, and the instrument is adapted for easy conversion from operation on different frequencies.

Still another object is to provide a novel instrument with an internal variable delay circuit and frequency divider wherein the variably controlled phase shifter is ahead of a frequency divider to thereby provide a phase accuracy which is a multiple of the variable delay.

A further object is to use in the receiver circuit the same lower frequency for amplification regardless of the frequency of operation, and to cause the downdivided frequency to be at the receiver frequency to provide the two signals to be used at the null-meter or phase comparator.

These and other objects will become more fully apparent from the claims, and from the description as it proceeds in conjunction with the appended drawings wherein:

FIG. 3 is a block diagram similar to FIG. 2 but showing an electronic interconnection between the coarse and fine adjustments;

FIG. 4 is a circuit diagram analogous to the photo detector receiver of FIG. 1 and illustrating a way for inductive compensation that may be needed where high frequency modulation frequencies are employed;

FIG. 5 illustrates a 90° hybrid circuit which can be used in the instrument of FIG. 1;

FIGS. 6A and 6B are front and end elevations of a simple goniometer or shaft position resolver which may be employed in the instrument of FIG. 1;

FIG. 7 shows a simple optical goniometer which may be used instead of the goniometer of FIG. 6; and FIG. 8 shows an electronic goniometer which may be employed as an alternative to the goniometers of FIGS. 6 or 7.

DETAILED DESCRIPTION

Figure 1:
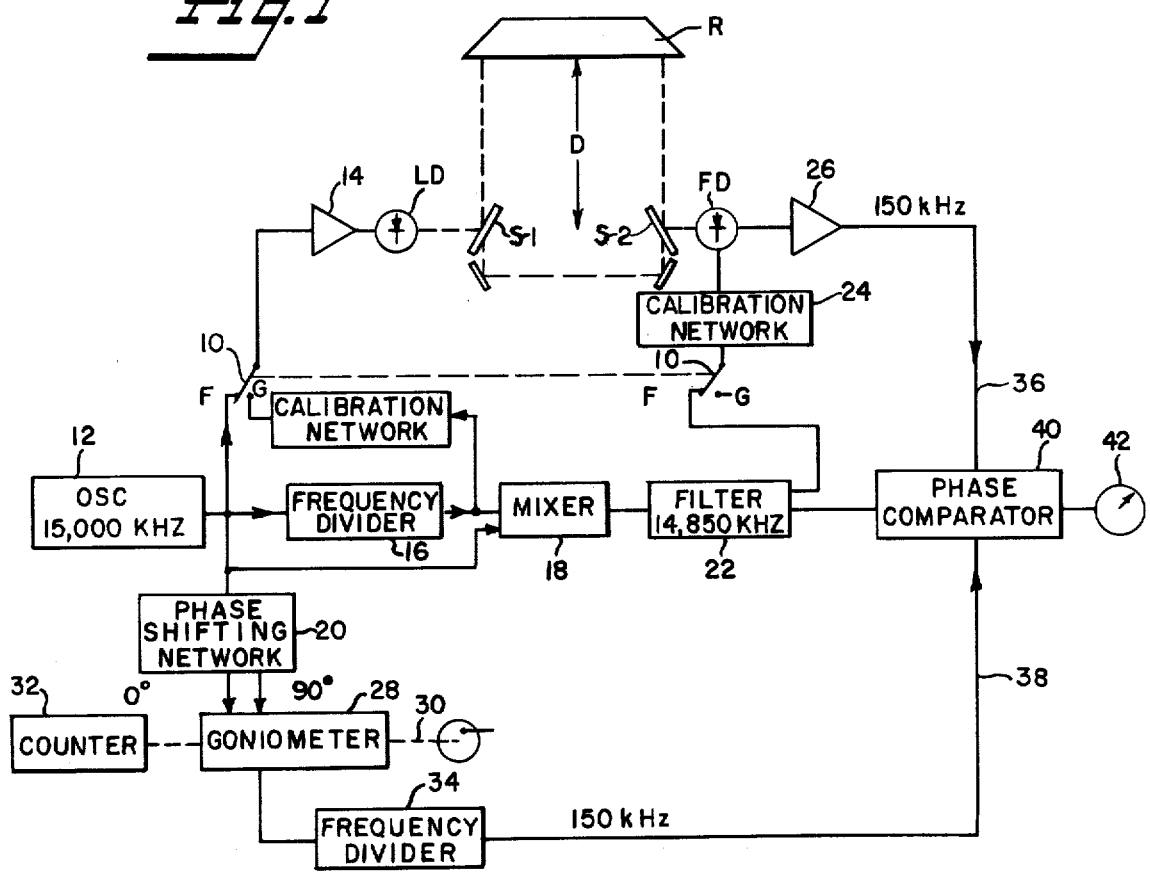
FIG. 1 is a block diagram of one embodiment of the instrument according to the present invention.

With reference to FIG. 1, the distance to be measured between the instrument and the distant object or reflector R is denoted as D. The distance is measured with either or both of two frequencies, preferably 15,000 kHz an 150 kHz, which permit a determination of the distance with a 10 meter interval or range when the high frequency signal is used and the total distance within a 1,000 meter interval or range when the lower frequency signal is used. A two pole, double throw switch 10 having positions F and G may be provided to control which frequency is used.

When measurements are made in the fine range F, the switch 10 is in the F position as illustrated. The control oscillator 12, which operates at 15,000 kHz, with the aid of an amplifier 14, is now providing the light diode LD with the modulation frequency energy. Light waves or pulses are now transmitted via the mirror S1 through the distance D to the reflector R and back to the photodiode FD via a mirror S2 at the receiver station. The method and instrument can employ any suitable type of radiant energy signal; the illustrated light emitting diode and photodiode have been found advantageous for certain practical applications.

The control oscillator 12 is also arranged to feed a frequency divider 16, a mixer 18, and a phase-shifting network 20. The frequency divider 16 divides the frequency by 100 from 15,000 kHz to 150 kHz.

In the output of the mixer 18, a heterodyning signal of 14,850 kHz may be filtered out with a bandpass filter 22 and be fed through the closed contacts of switch 10 to the photodiode FD via a calibration network 24. Network 24 can be of a very simple design and consist of a resistor and a variable condenser, as is well known to those skilled in this art.

The photodiode FD, which receives the radiant energy signal or light modulated with 15,000 kHz modulation frequency, functions as a mixer and will supply a 150 kHz IF signal to the amplifier 26. This allows the lower frequency 150 kHz signal to be processed in the receiver section rather than dealing with the high 15,000 kHz signal.

The phase-shifting network 20 (see also FIG. 5) is provided to supply the goniometer or shaft position resolver 28 with two voltages that have a 90° phase difference. The shaft 30 of the goniometer 28 is adjusted manually and may be mechanically coupled to a suitable counter 32 either of a dial or a digital type.

The electrical output from the goniometer 28, is connected to a divide by 100 electronic frequency divider 34 so that a 150 kHz signal is created in its output. For 360° phase shift of this signal 100 revolutions of the goniometer shaft 30 are required. A very precise phase-shift can thus be obtained since the phase accuracy is a multiple of the accuracy of the input signal to frequency divider 34.

The phase difference of the 150 kHz signals from the amplifier 26 on lead 36 and the frequency divider 34 on lead 38 is determined at a phase comparator 40 or similar device such as a null-meter and the phase indicated on the meter 42. In a suitable phase comparator circuit, for 90° difference, zero will be indicated on meter 42.

When measurements are made on 15,000 kHz, a change of 10 meters in the distance D will correspond to 360° phase change in the 150 kHz signal.

As this corresponds to 100 revolutions of shaft 30 of the goniometer 28, 1 millimeter in distance will correspond to 0.01 of a revolution tion. This accuracy is readily obtainable by various goniometers and three different configurations are described below in connection with FIGS. 6–8.

During measurement on the low frequency, i.e., 150 kHz, the switch 10 is moved to its alternate G position. The light diode LD is now supplied with a 150 kHz signal from the frequency divider 16 via calibration network 43 and amplifier 14.

The heterodyning 14,850 kHz signal from mixer 18 is disconnected by the switch contacts being at G and the photodiode FD at the receiver passes the 150 kHz signal directly to amplifier 26 as the frequency is already the same as the IF frequency when the high frequency modulation signal is used.

One turn on the goniometer shaft 30 will now correspond to 10 meters change of the distance D. The accuracy of the goniometer is now of less importance as the distance needs only to be determined within 2.5 meters. However, the output signal from frequency divider 34 is matched in frequency with the signal on lead 36 so that the same phase comparator circuit 40 can be used.

The instrument should be calibrated before the measurement which is done when the mirrors S1 and S2 are in calibration position and the light from the transmitting diode LD to receiver diode FD passes through calibration length between reflectors 44 and 46. The network 24 is adjusted on high frequency and network 43 on low frequency so that the indicator 42 shows zero.

In the case when the goniometer 28 has positions at every 10°, for instance, it is possible to equip mixer 18 with a scale for fine measurement.

In the FIG. 1 embodiment, the frequencies 150 kHz and 15,000 kHz have been used. Other frequencies can be used if the division of the frequency dividers is changed.

Figure 2:
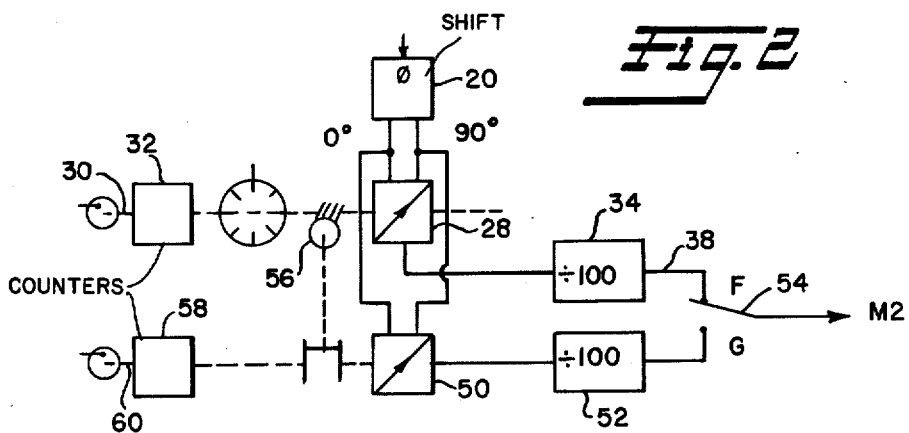
FIG. 2 is a block diagram of that portion of the instrument of FIG. 1 showing the parallel connection of two phase-shifters with a mechanical linkage for interconnecting the coarse and fine adjustments together.

Referring now to FIG. 2, a fast check of the distance on both frequencies is not possible with the arrangement according to FIG. 1. This can, however, be done if a second goniometer 50 and frequency divider 52 are added as shown in FIG. 2. An extra switch contact 54, which is also part of switch 10 may be provided so that goniometer 28 and frequency divider 34 are used for measurement on high frequency and goniometer 50 and frequency divider 52 are used for measurement on low frequency.

A special feature is introduced with a differential gear train 56 so that 1/100 of the revolutions of the shaft 30 is added to the counter 58 of goniometer 50. The result is that the positions of the shaft 60 of goniometer 50 will always be a number of whole revolutions. The requirements on goniometer 50 will therefore be very small which makes a simple automation possible.

An electronic version of the features in FIG. 2 is shown in FIG. 3. The goniometer 62 with its frequency divider 64 is connected to a filter 66 with built-in phase splitter. The filter 66 that passes 15,000 kHz is connected to the output of mixer 68. The phase of the signal of 150 kHz from frequency divider 64 will thus vary with $10^{-1}$ of the variation of goniometer 28 and $10^{-2}$ of the variation of goniometer 62. As the phase from the measurement within a 10 meter interval is divided properly and added to the phase angle of goniometer 62, only multiples of $2\pi$ will be required from goniometer 62.

It is also possible to use the electrical signal output from frequency divider 64 during measurement on the high frequency and obtain a very high resolution where the heterodyning frequency is not applied to photodiode FD at the receiver.

Referring now to FIG. 4, a circuit diagram is shown which is analogous to the receiver portion of the system of FIG. 1. The photo detector FD can be represented by a constant current generator with a parallel capacitor C and resistor Rp and a series resistor Rs. With the frequency of the output signal at 150 kHz impedance matching to the input of amplifier 26 can be obtained with a tapped inductor of reasonable size.

FIG. 5 is a circuit diagram of a phase shifting network circuit of conventional design that is especially well adapted for use in the circuit of FIG. 1. Its stability and the isolation of the output signal make the design of phase shifting network 20 easier and more accurate.

With reference to FIGS. 6A and 6B, a low cost goniometer is illustrated which has a toroid winding with taps, as is conventional. A cylindrical secondary winding is required only if a pin of ferroelectric iron is rotated in the center at an angle to the shaft.

An optical goniometer is illustrated in FIG. 7 which may be used in the instrument and method of the present invention. By varying the amount of light through light conductors $L_1$, $L_2$, $L_3$, and $L_4$ of different lengths in the path from a light emitting diode 70 to a photodiode 72, the necessary phase shift or delay can be achieved. The variable delay may be controlled by use of a disc 74 with holes 76 in a known manner.

A known type of electronic variable phase shifter for introducing a controlled phase shift is illustrated in FIG. 8 with two modulators 80, a fixed phase splitter such as network 20 (see FIG. 5), and the input and output electrical voltages.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. An instrument for measuring distance utilizing two signal paths, one signal path being outside of the instrument for radiant energy transmitted to and received from a distant object and the other signal path comprising an internal signal channel for a signal at a high frequency, said internal signal channel including a variable delay device for shifting by controllable amounts the phase of the high frequency signal and a first frequency divider for the shifted signal having an output signal at a lower frequency that has a phase accuracy which is a multiple of the accuracy of the variable delay device; a radiant energy signal generator; means for modulating the radiant energy signal from said generator at a first frequency; a receiver for said radiant energy signal including means responsive to the reception of said radiant energy signal for producing a signal at said lower frequency; and a phase comparator circuit for indicating a predetermined relationship between the phases of the two signals at said lower frequency.

2. The instrument according to claim 1 wherein the first frequency is equal to said lower frequency.

3. The instrument according to claim 1 wherein the first frequency is higher than said lower frequency, and the receiver includes a mixer having an input heterodyning signal which when modulated with the first frequency produces an electrical signal at said lower frequency.

4. The instrument according to claim 3 wherein said first frequency is equal to said higher frequency.

5. The instrument according to claim 1 wherein the radiant energy is visible radiation, the radiant energy signal generator is a light emitting diode, and the visible radiation is pulsed on and off at said first frequency.

6. The instrument according to claim 1 wherein said internal signal channel further includes a first high frequency oscillator with circuit means for interrupting the transmitted radiant energy signal at said high frequency, means for generating a heterodyning signal that is connected to said receiver to thereby produce in said receiver an electrical signal at said lower frequency.

7. The instrument according to claim 6 wherein the lower frequency is at least two orders of magnitude less than said high frequency and the receiver includes an amplifier for the lower frequency signal.

8. The instrument according to claim 7 wherein said internal signal channel further includes a second variable delay device for shifting by controllable amounts the phase of the high frequency signal and a second frequency divider for the shifted signal from said second delay device, said second frequency divider having an output signal at a lower frequency, and means for adjusting the phase of both shifted signals to provide a coarse and a fine indication of the distance to be measured.

9. The instrument according to claim 8 wherein said phase adjusting means for said first and second delay devices are mechanically linked together to provide a correlation between the coarse and fine indications.

10. The instrument according to claim 8 wherein said phase adjusting means for said first and second delay devices are electrically linked together to provide a correlation between the coarse and fine indications.

11. A method of measuring distance utilizing an instrument having a transmitter and a receiver comprising the steps of:

transmitting a radiant energy signal modulated at a first frequency between the instrument and a distant object;

converting the radiant energy signal at the instrument receiver into an electrical signal at a second lower frequency;

comparing the time delay of the radiant energy signal as it traverses the distance between the instrument and the distant object and back to the instrument with the time delay of an alternating voltage signal traversing a signal channel internally within said instrument by:

i. delaying the alternating voltage signal at said first frequency in the instrument signal channel by an amount controlled to be related to the delay of the transmitted radiant energy signal;

ii. dividing the frequency of said delayed alternating voltage signal to provide a second alternating voltage signal at said second lower frequency which has a phase accuracy that is a multiple of the accuracy of the alternating voltage signal at said first frequency; and iii. using said lower frequency alternating voltage signal for phase comparison with the electrical signal at said receiver having said second lower frequency.

* * * * *